(12) United States Patent
Shusterman (10) Patent No.: US 7,865,204 B1
(45) Date of Patent: Jan. 4, 2011

(54) SYSTEM AND METHOD FOR A MULTI-TECHNOLOGY CONTROL CHANNEL FOR WIRELESS DEVICES

(75) Inventor: Alex Shusterman, Vienna, VA (US)

(73) Assignee: Nextel communications Inc., Reston, VA (US)

( * ) Notice: Subject to any disclaimer, the term of this patent is extended or adjusted under 35 U.S.C. 154(b) by 739 days.

(21) Appl. No.: 11/415,501

(22) Filed: May 1, 2006

(51) Int. Cl.
H04B 7/00 (2006.01)

(52) U.S. Cl. ............... 455/515; 455/448; 455/449; 455/450; 370/311; 370/465; 370/466

(58) Field of Classification Search ............. 455/455, 455/448–452.1, 574, 572, 552.1, 343.2–343.4; 370/311, 465–467, 469, 481, 482, 487, 529
See application file for complete search history.

(56) References Cited

U.S. PATENT DOCUMENTS

| | | | | |
|---|---|---|---|---|
| 5,930,679 A * | 7/1999 | Olds et al. | | 455/12.1 |
| 6,075,981 A * | 6/2000 | Shah et al. | | 455/403 |
| 6,356,767 B2 * | 3/2002 | Froula | | 455/512 |
| 6,594,242 B1 * | 7/2003 | Kransmo | | 370/331 |
| 6,658,022 B1 * | 12/2003 | West et al. | | 370/467 |
| 7,003,302 B2 * | 2/2006 | Yoshida et al. | | 455/450 |
| 7,457,277 B1 * | 11/2008 | Sharma et al. | | 370/351 |
| 2002/0071480 A1 * | 6/2002 | Marjelund et al. | | 375/141 |
| 2004/0137894 A1 * | 7/2004 | Paivike et al. | | 455/419 |
| 2005/0181822 A1 * | 8/2005 | Sasaki et al. | | 455/552.1 |
| 2005/0255872 A1 * | 11/2005 | Lundell et al. | | 455/522 |
| 2007/0064641 A1 * | 3/2007 | Laroia et al. | | 370/320 |

* cited by examiner

Primary Examiner—Edward Urban
Assistant Examiner—Fayyaz Alam (57) ABSTRACT

A system and method for providing information to a mobile station in a wireless network are provided. According to the method, a mobile station receives a control channel message wrapped in a unified control channel from a base station, and the mobile station determines a transmission type for incoming data, based upon the unified control channel. For a mobile station that operates with multiple transmission types, the mobile station does not have to monitor each of the control channels that the mobile station can receive, because the unified control channel tells the mobile station which transmission type to listen to. Therefore, the battery life of the mobile station can be extended, because the mobile station does not have to monitor numerous control channels.

16 Claims, 10 Drawing Sheets

IS-2000 Forward Control Channel Message wrapped in the Unified Control Channel

| 7 | 6 | 5 | 4 | 3 | 2 | 1 | 0 | Octet |
|---|---|---|---|---|---|---|---|---|
| UCC AT ID [0000 to 1111]* | | | | Message Type [0000 to 1111]** | | | | 1 |
| ⇒ Message Type II= [0BH] | | | | | | | | 1 |
| ⇒ Forward Layer 3 IS-2000 FCH/DCCH Data {I: | | | | | | | | |
| FPC: SLC = [ 0001 to 0110 ] | | | | FSN = [ 0000 to 1111 ] | | | | 1 |
| FPC: GR = [00H – FFH ] | | | | | | | | 2 |
| RPC: OLT = [00H – FFH ] | | | | | | | | 3 |
| IS-2000Frame Content = [00H-08H, 0AH-12H ] | | | | | | | | 4 |
| (MSB) Forward Link Information + Layer 3 Fill = <any value> | | | | | | | | 5 |
| | | | | | | | | ... |
| | | | | | | | (LSB) | n |
| } Forward Layer 3 IS-2000 FCH/DCCH Data | | | | | | | | |
| (MSB) ⇒ Message CRC= [0000H-FFFFH] | | | | | | | (LSB) | 1 |
| | | | | | | | | 2 |

Typical IS-2000 Forward Control Channel Message

| 7 | 6 | 5 | 4 | 3 | 2 | 1 | 0 | Octet |
|---|---|---|---|---|---|---|---|---|
| ⇒ Message Type II= [0BH] | | | | | | | | 1 |
| ⇒ *Forward Layer 3 IS-2000 FCH/DCCH Data {1:* | | | | | | | | |
| FPC: SLC = [ 0001 to 0110 ] | | | | FSN = [ 0000 to 1111 ] | | | | 1 |
| FPC: GR = [00H - FFH ] | | | | | | | | 2 |
| RPC: OLT = [00H - FFH ] | | | | | | | | 3 |
| *IS-2000*Frame Content = [00H-08H, 0AH-12H ] | | | | | | | | 4 |
| (MSB) Forward Link Information + Layer 3 Fill = <any value> (LSB) | | | | | | | | 5 |
| | | | | | | | | ... |
| | | | | | | | | n |
| *} Forward Layer 3 IS-2000 FCH/DCCH Data* | | | | | | | | |
| (MSB) ⇒ Message CRC= [0000H-FFFFH] (LSB) | | | | | | | | 1 |
| | | | | | | | | 2 |

FIGURE 5

IS-2000 Forward Control Channel Message wrapped in the Unified Control Channel

| 7 | 6 | 5 | 4 | 3 | 2 | 1 | 0 | Octet |
|---|---|---|---|---|---|---|---|---|
| UCC AT ID [0000 to 1111]* | | | | Message Type [0000 to 1111]** | | | | 1 |
| colspan=8: ⇒ Message Type II= [0BH] | | | | | | | | 1 |
| colspan=8: ⇒ *Forward Layer 3 IS-2000 FCH/DCCH Data {I:* | | | | | | | | |
| colspan=4: FPC: SLC = [ 0001 to 0110 ] | | | | colspan=4: FSN = [ 0000 to 1111 ] | | | | 1 |
| colspan=8: FPC: GR = [00H – FFH ] | | | | | | | | 2 |
| colspan=8: RPC: OLT = [00H – FFH ] | | | | | | | | 3 |
| colspan=8: *IS-2000*Frame Content = [00H-08H, 0AH-12H ] | | | | | | | | 4 |
| colspan=8: (MSB) | | | | | | | | 5 |
| colspan=8: Forward Link Information + Layer 3 Fill = <any value> | | | | | | | | ... |
| colspan=8: (LSB) | | | | | | | | n |
| colspan=8: *} Forward Layer 3 IS-2000 FCH/DCCH Data* | | | | | | | | |
| colspan=8: (MSB)   ⇒ Message CRC= [0000H-FFFFH]   (LSB) | | | | | | | | 1 |
| colspan=8: | | | | | | | | 2 |

FIGURE 6

Typical GSM Paging Request Type 1 Message

| 7 | 6 | 5 | 4 | 3 | 2 | 1 | 0 | Octet |
|---|---|---|---|---|---|---|---|---|
| ⇒ | *L2 Pseudo Length {* | | | | | | | |
| | | | Pseudo Length IEI | | | | | 1 |
| | | Pseudo Length value | | | | | | 2 |
| *} L2 Pseudo Length* | | | | | | | | |
| | | Skip Indicator | | | RR protocol discriminator | | | 1 |
| | | | Message Type | | | | | 1 |
| | | Page Mode IEI | | Spare | Spare | | PM | 1 |
| | | Channel Needed IEI | | Channel (second) | | Channel (first) | | 1 |
| ⇒ | *Mobile Identity 1 {* | | | | | | | |
| | | | Mobile Identity IEI | | | | | 1 |
| | | Length of mobile identity contents | | | | | | 2 |
| | | Identity digit 1 | | Odd/Even Indication | Type of identity | | | 3 |
| | | ... | | | Identity digit 2 | | | ... |
| | | Identity digit p+1 | | | Identity digit p | | | 9 |
| *} Mobile Identity* | | | | | | | | |
| | ⇒ | *Mobile Identity 2 (optional) {* | | | | | | |
| | | | Mobile Identity IEI | | | | | 1 |
| | | Length of mobile identity contents | | | | | | 2 |
| | | Identity digit 1 | | Odd/Even Indication | Type of identity | | | 3 |
| | | ... | | | Identity digit 2 | | | ... |
| | | Identity digit p+1 | | | Identity digit p | | | 10 |
| *} Mobile Identity* | | | | | | | | |
| | | | P1 Reset Octets | | | | | 1 ... 9 |

FIGURE 7

GSM Paging Request Type 1 Message wrapped in the Unified Control Channel

| 7 | 6 | 5 | 4 | 3 | 2 | 1 | 0 | Octet |
|---|---|---|---|---|---|---|---|---|
| UCC AT ID [0000 to 1111]* | | | | Message Type [0000 to 1111]** | | | | 1 |
| ⇒ *L2 Pseudo Length {* | | | | | | | | |
| Pseudo Length IEI | | | | | | | | 1 |
| colspan="6" Pseudo Length value | | | | | | colspan="2" | | 2 |
| *} L2 Pseudo Length* | | | | | | | | |
| Skip Indicator | | | | RR protocol discriminator | | | | 1 |
| Message Type | | | | | | | | 1 |
| Page Mode IEI | | | | Spare | Spare | PM | | 1 |
| Channel Needed IEI | | | | Channel (second) | | Channel (first) | | 1 |
| ⇒ *Mobile Identity 1 {* | | | | | | | | |
| Mobile Identity IEI | | | | | | | | 1 |
| Length of mobile identity contents | | | | | | | | 2 |
| Identity digit 1 | | | | Odd/Even Indication | Type of identity | | | 3 |
| ... | | | | Identity digit 2 | | | | ... |
| Identity digit p+1 | | | | Identity digit p | | | | 9 |
| *} Mobile Identity* | | | | | | | | |
| ⇒ *Mobile Identity 2 (optional) {* | | | | | | | | |
| Mobile Identity IEI | | | | | | | | 1 |
| Length of mobile identity contents | | | | | | | | 2 |
| Identity digit 1 | | | | Odd/Even Indication | Type of identity | | | 3 |
| ... | | | | Identity digit 2 | | | | ... |
| Identity digit p+1 | | | | Identity digit p | | | | 10 |
| *} Mobile Identity* | | | | | | | | |
| P1 Reset Octets | | | | | | | | 1 ... 9 |

Exemplary MCC Uplink Message Format

| 7 | 6 | 5 | 4 | 3 | 2 | 1 | 0 | Octet |
|---|---|---|---|---|---|---|---|---|
| Message Type | | Attempt Count | | Mobile ID type | | | | 1 |
| Length of mobile identity | | | | | | | | 2 |
| Identity digit 2 | | | | Identity digit 1 | | | | 3 |
| ... | | | | Identity digit 3 | | | | ... |
| Identity digit N | | | | Identity digit N-1 | | | | 10 |
| Access Capability List Length | | | | AC ID 1 | | | | 1 |
| AC ID 3 | | | | AC ID 2 | | | | 2 |
| AC ID Y | | | | ... | | | | y |

FIGURE 10

Exemplary MCC Downlink Message Format

| 7 | 6 | 5 | 4 | 3 | 2 | 1 | 0 | Octet |
|---|---|---|---|---|---|---|---|---|
| Message Type | | Attempt Count | | Mobile ID type | | | | 1 |
| Length of mobile identity | | | | | | | | 2 |
| Identity digit 2 | | | | Identity digit 1 | | | | 3 |
| ... | | | | Identity digit 3 | | | | ... |
| Identity digit N | | | | Identity digit N-1 | | | | 10 |
| UCC Assignment ID | | | | spare | | | | 1 |

SYSTEM AND METHOD FOR A MULTI-TECHNOLOGY CONTROL CHANNEL FOR WIRELESS DEVICES

BACKGROUND OF THE INVENTION

The present invention relates to control channels for mobile devices that can operate according to different wireless technologies. More particularly, the present invention relates to providing control channel information to a mobile station in a wireless network with a unified control channel.

Currently, individual wireless radio frequency (RF) technologies utilize a set of control channels within the range of their RF band for various control functions, e.g., paging, cell identity, traffic channel assignment, etc. RF bands for various technologies include 800 MHz for the Specialized Mobile Radio (SMR) system, 800 MHz for the Global System for Mobile communication (GSM) system, 1.9 GHz for the IS-95 or IS-2000 Code Division Multiple Access (CDMA) system, 2.5 GHz for the Multichannel Multipoint Distribution Service (MMDS) system, 900 MHz, 2.4 GHz and 5.8 GHz for Industrial, Scientific and Medical (ISM) systems, and 5 GHz for the Unlicensed Nation Information Infrastructure (UNIT) system, for example. The messages carried in the control channel of these different wireless technologies are typically in different formats.

In a multi-technology network, which combines two or more of the RF technology bands, each of the technologies has its own set of control channels to provide services within the RF bands. For each technology, the proper control channel must be monitored to determine any activity within that technology, so that incoming and outgoing calls, messaging, voicemail notifications, etc. can be established within a mobile station when required. Scanning of the various RF technologies' control channels puts a burden on the electronics and reduces the life of a battery charge of the mobile station.

SUMMARY OF THE INVENTION

The present invention provides a system and method for providing control channel information to a mobile station in a wireless network. In particular, a unified control channel combines the multiple control channels of various technologies into a single set of flexible control channels capable of relaying and duplicating all individual technology control channels, regardless of the number of technologies being combined.

In accordance with exemplary embodiments of the present invention, a method for providing control channel information includes receiving a unified control channel at a mobile station and identifying a transmission type, based upon the unified control channel.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
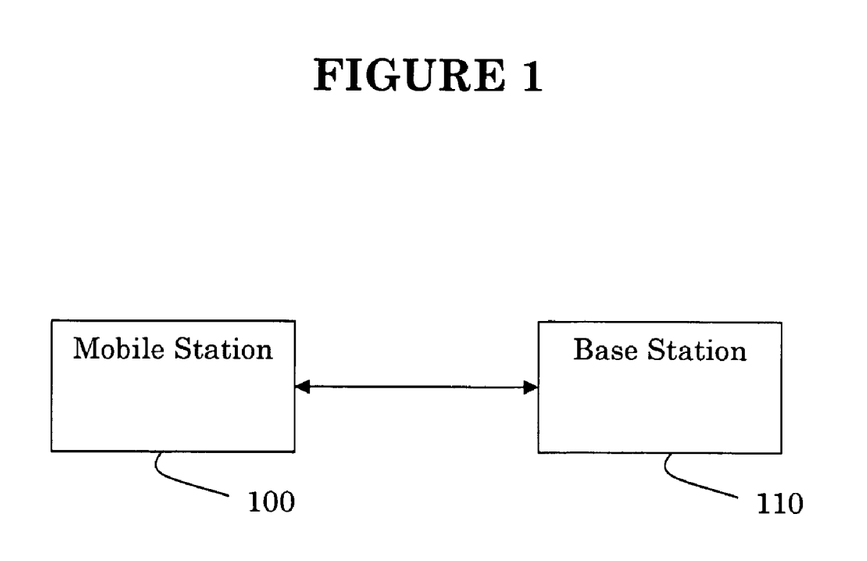
FIG. 1 illustrates an exemplary embodiment of a system in accordance with the present invention.

FIG. 1 illustrates an exemplary embodiment of a system in accordance with the present invention. Included in the illustrated system are a mobile station 100 and a base station 110. The mobile station 100 may be any type of wireless device, for example, a pocket PC, a personal PC, a personal information manager, a personal digital assistant, a cellular telephone, etc. The base station 110 is configured to transmit a unified control channel, and the mobile station 100 is configured to receive the unified control channel and determine a transmission type, based upon the unified control channel, as described below.

Figure 2:
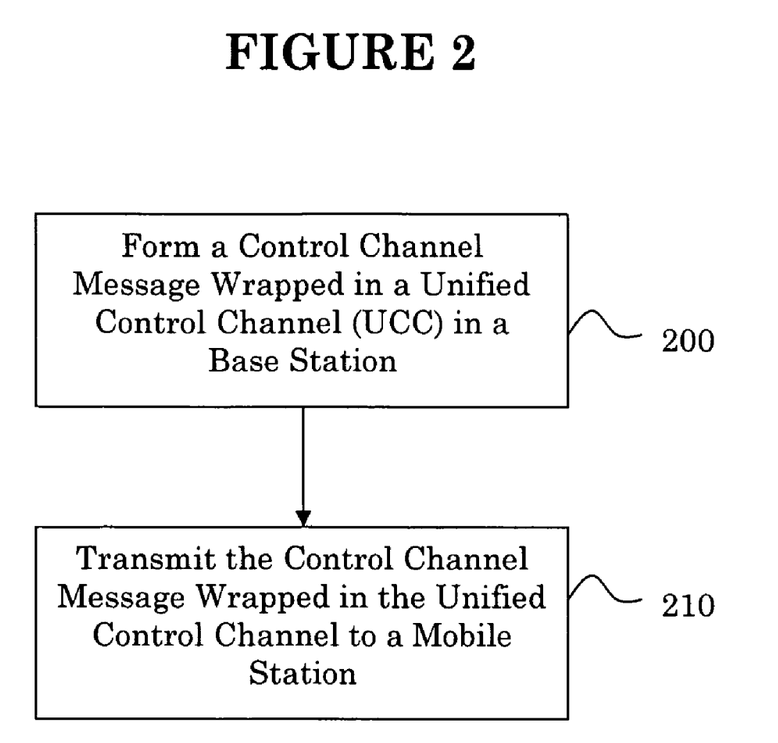
FIG. 2 illustrates an exemplary embodiment of a method in accordance with the present invention.

FIG. 2 illustrates an exemplary embodiment of a method in accordance with the present invention. In step 200, a base station forms a control channel message wrapped in a unified control channel. The control channel message includes a header format (i.e., the unified control channel) common to all control channel messages and a body which is formatted according to different wireless technologies (i.e., access types). Accordingly, a control channel at a particular radio frequency can include control channel messages with the bodies formatted according to different wireless technologies. In step 210, the control channel message wrapped in the unified control channel is transmitted to a mobile station.

Figure 3:
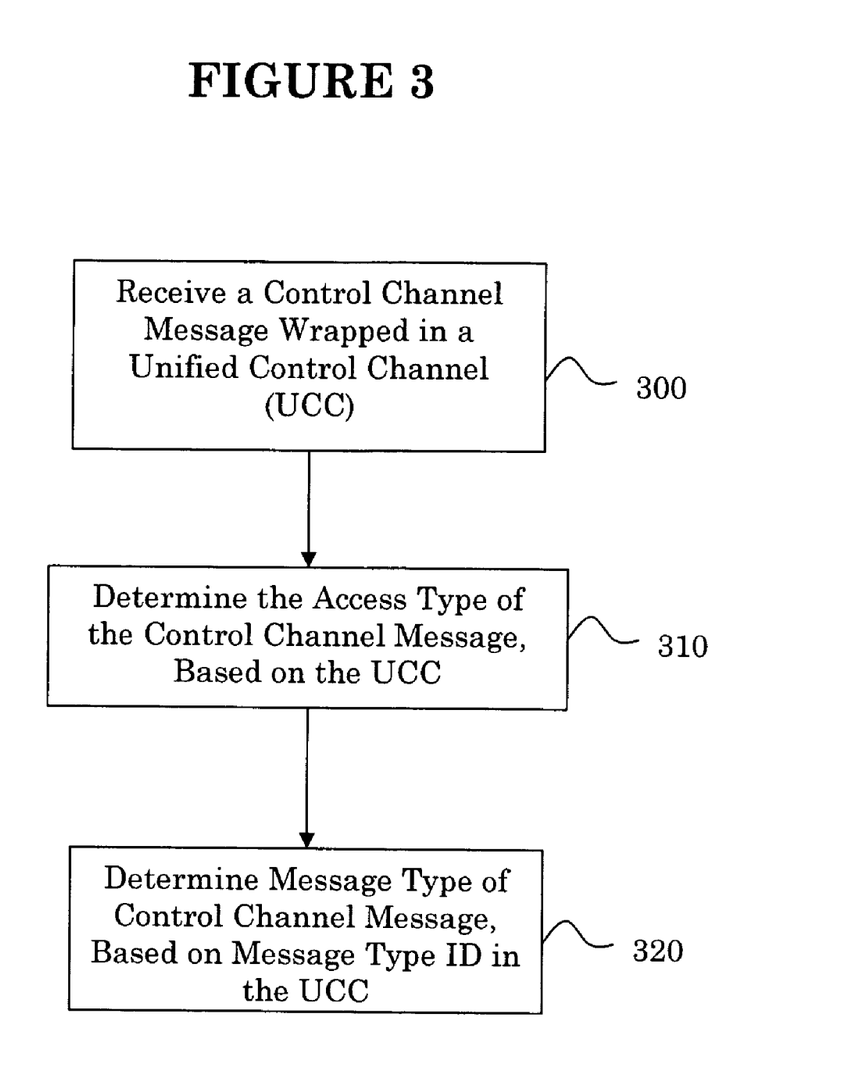
FIG. 3 illustrates an exemplary embodiment of another method in accordance with the present invention.

FIG. 3 illustrates an exemplary embodiment of a method in accordance with the present invention. In step 300 of the exemplary method, a control channel message wrapped in a unified control channel is received by a mobile station. The control channel message includes a header format (i.e., unified control channel) common to all control channel messages and a body which is formatted according to different wireless technologies. Accordingly, a control channel at a particular radio frequency can include control channel messages with the bodies formatted according to different wireless technologies. A transmission type, also referred to as an access type, of the received message is determined in step 310 based on the unified control channel. The access type may be SMR, GSM, IS-95, IS-2000, MMDS, ISM, or UNII, for example, each of which would have a different identifier. In step 320, a type of control input, also referred to as a message type, may be determined based on the unified control channel. In particular, the message type may be determined based upon a message type identifier included in the unified control channel. Message types may include paging, cell identity, traffic channel assignment, etc. In an exemplary embodiment of the present invention, the unified control channel is eight bits long, including a 4-bit access type identifier and a 4-bit message type identifier. Exemplary messages and unified control channels are illustrated in FIGS. 4-7, which are described below.

By providing a multi-mode mobile station with a unified control channel, the mobile station does not have to monitor each of the control channels that the mobile station can receive. Instead, the mobile station looks to the unified control channel, which tells the mobile station which access type to listen to. Therefore, the operation of the mobile station is simplified. Further, the battery life of the mobile station can be extended, because the mobile station does not have to monitor numerous control channels. Although primarily intended for multi-mode mobile devices, the present invention is also applicable to single mode devices.

Figure 4:
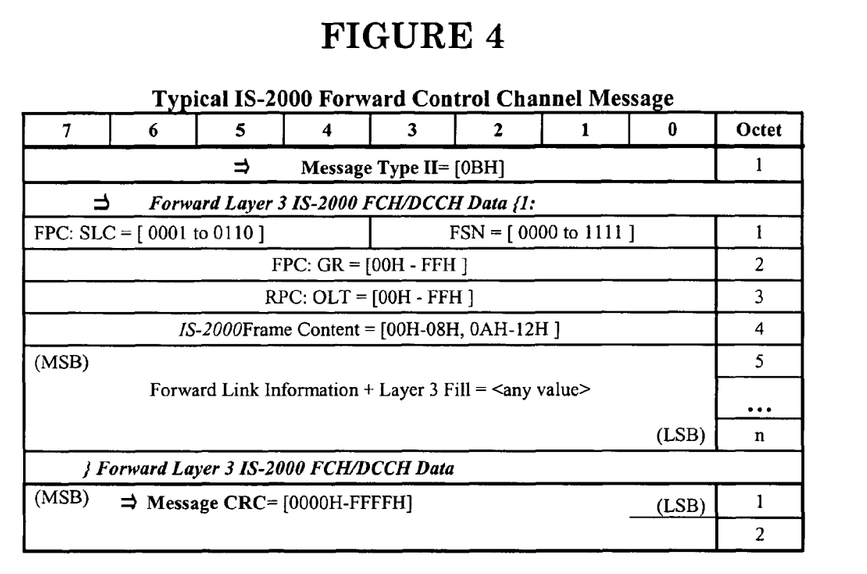
FIG. 4 illustrates a typical IS-2000 forward control channel message.
Figure 5:
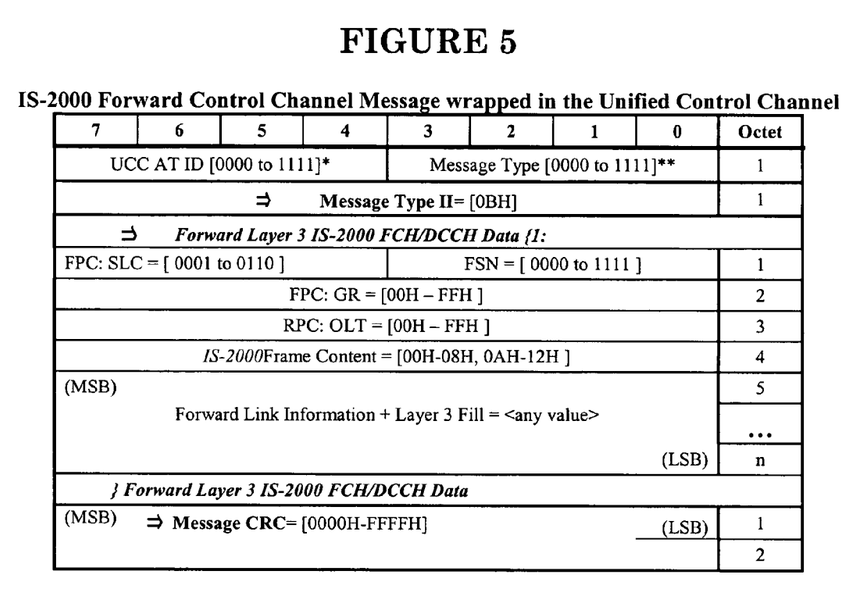
FIG. 5 illustrates an exemplary embodiment of an IS-2000 forward control channel message in accordance with the present invention.

FIG. 4 illustrates a typical IS-2000 forward control channel message. FIG. 5 illustrates an exemplary embodiment of an IS-2000 forward control channel message in accordance with the present invention. As illustrated in FIG. 5, the control channel message according to the present invention may be the same as that of a typical control channel message, except that a unified control channel is present at the beginning of the control channel message in FIG. 5. The unified control channel may include a unified control channel access type ID and a message type. As shown in FIG. 5, each of the two parts of the unified control channel may have 4 bits, for example. Each access type is assigned a unique ID. The message type data may be specific to the unified control channel access type ID. In other words, each access type may have its own set of message types. Although the message type data in the unified control channel may seem redundant in this example, it is necessary because TDM technologies use time slots and interleave to populate control channel information and may not have explicit header detail to identify the message type or the message type may not be in a fixed position within the message structure.

Figure 6:
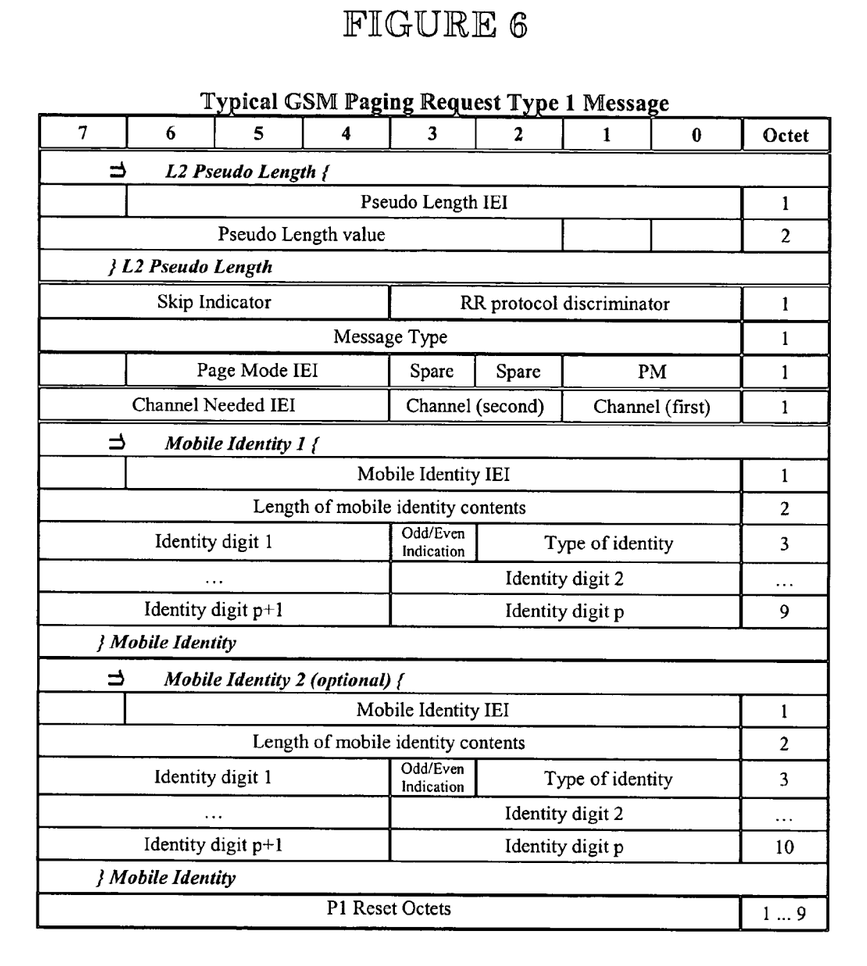
FIG. 6 illustrates a typical GSM paging request type 1 message.
Figure 7:
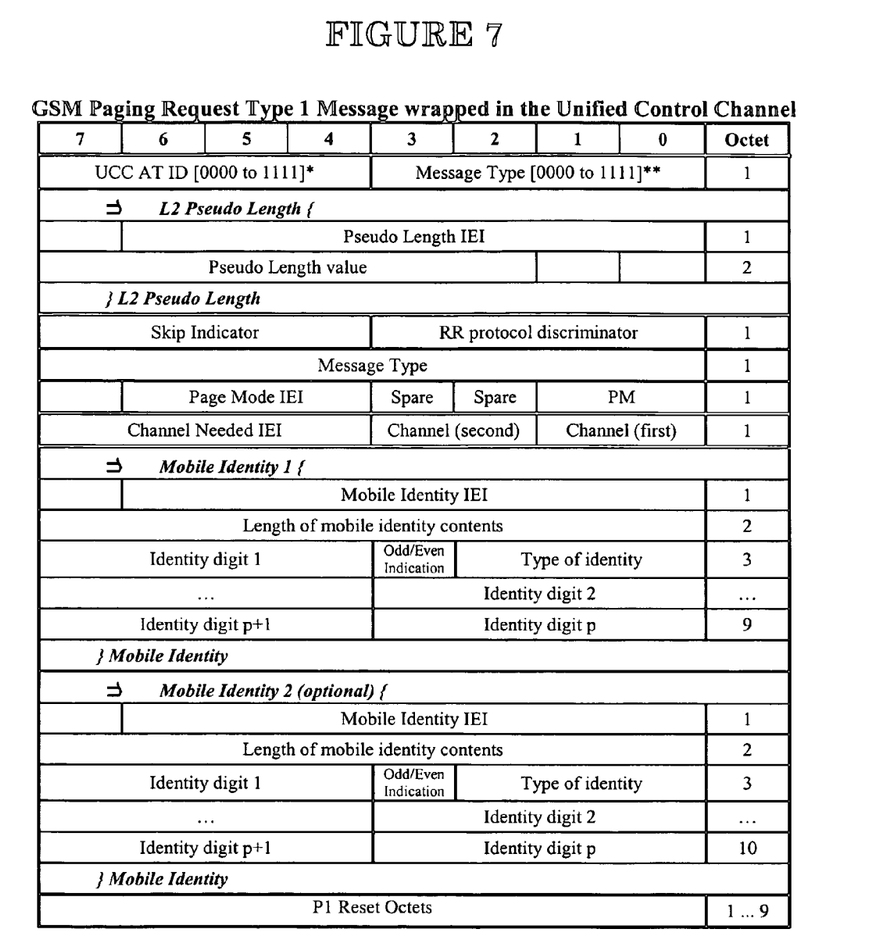
FIG. 7 illustrates an exemplary embodiment of a GSM paging request type 1 message in accordance with the present invention.

FIG. 6 illustrates a typical GSM paging request type 1 message. FIG. 7 illustrates an exemplary embodiment of a GSM paging request type 1 message in accordance with the present invention. The difference between the messages illustrated in FIGS. 5 and 6 is the unified control channel added to the message as a header, in accordance with the present invention. The unified control channel illustrated in FIG. 7 includes a 4-bit unified control channel access type ID and a 4-bit message type. The bit lengths are merely exemplary, and other bit lengths may be used. Each access type is assigned a unique ID. As described above, the message type data is specific to the unified control channel access type ID.

In another embodiment of the present invention, there is provided a master control channel for requesting an assignment of a unified control channel and assigning the requested unified control channel. The mobile station may house either a single mode radio or be multi-mode capable with multiple radios. The request message would indicate the radio technology capability of the mobile station. The request over the master control channel could then be processed to provide load sharing across the n-number of radio access technologies being offered by assigning an appropriate unified control channel that is within the capability of the mobile station. Since the master control channel is a random access channel it would have to deal with the possibility of request collisions from two or more mobile stations and the mobile stations would have to be aware of the lack of response and follow a retry algorithm to continue requests until a unified control channel is assigned.

Figure 8:
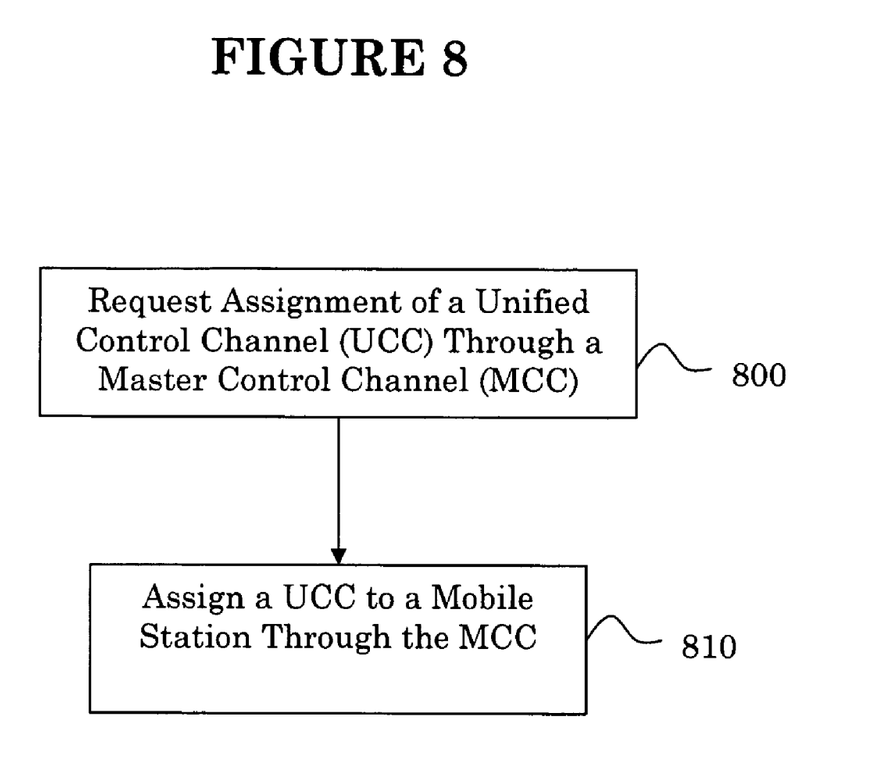
FIG. 8 illustrates an exemplary method for providing a master control channel in accordance with the present invention.

FIG. 8 illustrates an exemplary method for providing a master control channel in accordance with the present invention. In step 700, a mobile station requests an assignment of a unified control channel through the master control channel, as shown in FIG. 9.

The master control channel is used to assign a unified control channel. All authentication and authorization will take place over other channels, e.g., the unified control channel or technology specific channels, before reverting to idle mode and listening on the unified control channel.

Figure 9:
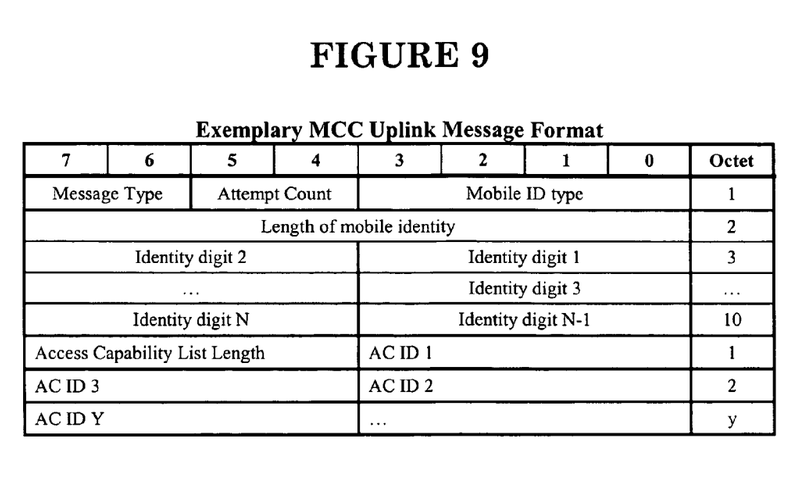
FIG. 9 illustrates an exemplary master control channel uplink message format in accordance with the present invention.

FIG. 9 illustrates an exemplary master control channel uplink message format. As illustrated, the exemplary message format includes a message type, an attempt count, and a mobile ID type. The message type may be, for example, an assignment request, assignment acknowledge, etc. The attempt count indicates attempt/retry activity. In an exemplary embodiment of the present invention, higher counts may get priority treatment in unified control channel assignment. The mobile ID type specifies the type of identification being supplied, for example, IMSI, ESN, etc.

As illustrated in FIG. 9, the exemplary master control channel uplink message format may further include a field for identifying a length of the mobile ID. As ID lengths vary for various access technologies, e.g., CDMA, GSM, etc., this field indicates the number of digits in the mobile ID. Also, the exemplary message format includes fields for ID digits 1 through N. The illustrated list of ID digits has a variable length, and thus it could be increased to as many digits as necessary.

FIG. 9 includes an Access Capability List Length, which indicates the number of radio technologies (i.e., access types) a mobile station supports. Each of the supported radio technologies has an ID, as illustrated by AC ID 1 through AC ID Y. The list of access capability IDs may be used as an access type priority list by the unified control channel assignment engine. For example, the access capability IDs may be listed in order of priority of the access types.

Figure 10:
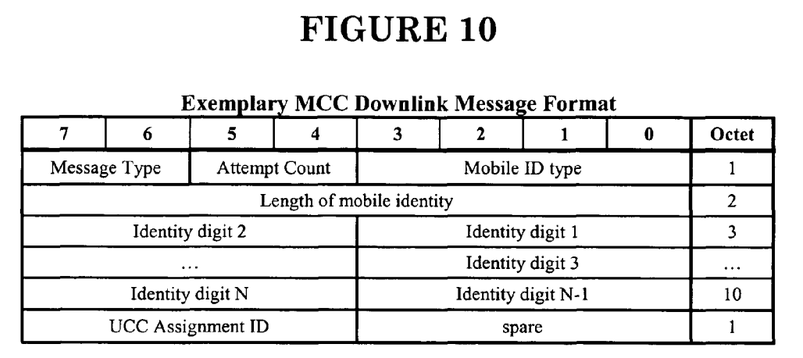
FIG. 10 illustrates an exemplary master control channel downlink message format in accordance with the present invention.

FIG. 8 further illustrates step 710, in which a base station assigns a unified control channel to the mobile station through the master control channel, as shown in FIG. 10.

FIG. 10 illustrates an exemplary master control channel downlink message format in accordance with the present invention. The exemplary downlink format includes many of the same fields as the exemplary uplink format shown in FIG. 9, and thus the explanation thereof is not repeated here. One of the fields in the exemplary downlink format that is not included in the exemplary uplink format is the UCC Assignment ID. The unified control channel assignment ID indicates the unified control channel access type for the mobile to listen on. Thus, the master control channel downlink message may be used to inform the mobile station on which access type the unified control channel will be transmitted.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting control channel information to mobile stations, the method comprising the acts of:
    forming at a first base station in a wireless communication system a control channel message wrapped in a unified control channel, the unified control channel including an access type identifier that indicates a wireless communication system access type from among a plurality of wireless communication system access types available for the control channel message and including a message type identifier that indicates a type of message, corresponding to the wireless communication system access type, contained in the control channel message; and
    transmitting the control channel message wrapped in the unified control channel to a plurality of mobile stations in a single control channel of the first base station;
    wherein the unified control channel is common to the plurality of wireless communication system access types and is formed as a header of the control channel message, and
    wherein the control channel message comprises control channel information of the first base station and is formatted according to the indicated wireless communication system access type.

2. The method of claim 1, wherein the message type identifier indicates a message type comprising one of paging, cell identity, and traffic channel assignment.

3. The method of claim 1, wherein the access type comprises one of SMR, GSM, IS-95, IS-2000, MMDS, ISM, or UNII.

4. A method for providing control channel information to a mobile station in a wireless network, comprising the acts of:
    receiving from a first base station in a wireless communication system a control channel message wrapped in a unified control channel, the unified control channel including an access type identifier that indicates a wireless communication system access type of the control channel message from among a plurality of wireless communication system access types available for the control channel message and including a message type identifier that indicates a type of message, corresponding to the wireless communication system access type, contained in the control channel message; and
    determining the access type of the control channel message, based upon the unified control channel;
    wherein the unified control channel is common to the plurality of wireless communication system access types and is formed as a header of the control channel message, and
    wherein the control channel message comprises control channel information of the first base station and is formatted according to the indicated wireless communication system access type.

5. The method of claim 4, further comprising the act of:
    determining a message type, based upon the message type identifier.

6. The method of claim 4, wherein the access type comprises one of SMR, GSM, IS-95, IS-2000, MMDS, ISM, or UNII.

7. The method of claim 4, wherein the access type identifier and the message type identifier each comprise four bits of data.

8. The method of claim 4, wherein the unified control channel comprises at least eight bits of data.

9. A method for providing control channel information to a mobile station in a wireless network, comprising the acts of:
    requesting assignment from a first base station in a wireless communication system of a unified control channel, the unified control channel including a wireless communication system access type identifier that indicates an access type of the control channel message from among a plurality of wireless communication system access types available for the control channel message and a message type identifier that indicates a type of message, corresponding to the wireless communication system access type, contained in the control channel message; and
    assigning the unified control channel to the mobile station by a master control channel downlink message;
    wherein the unified control channel is common to the plurality of wireless communication system access types and is formed as a header of the control channel message, and
    wherein the control channel message comprises control channel information of the first base station and is formatted according to the indicated wireless communication system access type.

10. The method of claim 9, wherein the master control channel uplink message comprises an access capability identifier.

11. The method of claim 9, wherein the master control channel uplink message comprises a mobile station identifier type.

12. The method of claim 9, wherein the master control channel uplink message comprises an access capability list length field.

13. A system for providing control channel information in a wireless network, comprising:
    a base station configured to transmit a control channel message wrapped in a unified control channel, the unified control channel including a wireless communication system access type identifier that indicates a wireless communication system access type available for the control channel message from among a plurality of wireless communication system access types and a message type identifier that indicates a type of message, corresponding to the wireless communication system access type, contained in the control channel message; and
    a mobile station configured to receive the unified control channel and determine a transmission type, based upon the unified control channel;
    wherein the unified control channel is common to the plurality of wireless communication system access types and is formed as a header of the control channel message, and
    wherein the control channel message comprises control channel information of the first base station and is formatted according to the indicated wireless communication system access type.

14. The system of claim 13, wherein the mobile station is further configured to determine a control channel type, based upon the unified control channel.

15. The system of claim 13, wherein the mobile station is further configured to receive data associated with the unified control channel.

16. The system of claim 13, wherein the access type comprises one of SMR, GSM, IS-95, IS-2000, MMDS, ISM, or UNII.

* * * * *